(12) United States Patent
Kounosu

(10) Patent No.: US 12,467,791 B2
(45) Date of Patent: Nov. 11, 2025

(54) IMAGE PROCESSING DEVICE AND COMPUTER-READABLE STORAGE MEDIUM

(71) Applicant: FANUC CORPORATION, Yamanashi (JP)

(72) Inventor: Yuuji Kounosu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 307 days.

(21) Appl. No.: 18/033,070

(22) PCT Filed: Nov. 16, 2021

(86) PCT No.: PCT/JP2021/042010
§ 371 (c)(1),
(2) Date: Apr. 21, 2023

(87) PCT Pub. No.: WO2022/107743
PCT Pub. Date: May 27, 2022

(65) Prior Publication Data
US 2023/0392985 A1 Dec. 7, 2023

(30) Foreign Application Priority Data
Nov. 19, 2020 (JP) ................................. 2020-192325

(51) Int. Cl.
*G01J 3/46* (2006.01)
(52) U.S. Cl.
CPC ......... *G01J 3/462* (2013.01); *G01J 2003/467* (2013.01)

(58) Field of Classification Search
CPC ............... G01J 3/462; G01J 2003/467; G06T 2207/10024; G06T 2207/20081; G06T 2207/20084; G06T 7/0004
See application file for complete search history.

(56) References Cited

U.S. PATENT DOCUMENTS

2002/0184168 A1  12/2002  McClanahan et al.

FOREIGN PATENT DOCUMENTS

| CN | 109215090 A | 1/2019 |
|---|---|---|
| CN | 110475043 A | 11/2019 |
| JP | H11-69177 A | 3/1993 |
| JP | 2014-190821 A | 10/2014 |
| JP | 2015035755 A | 2/2015 |
| JP | 2019-61505 A | 4/2019 |

OTHER PUBLICATIONS

Leon, "Color measurement in L* a * b* units from RGB digital images" ScienceDirect, pub. Mar. 11, 2006. (Year: 2006).*

(Continued)

*Primary Examiner* — Mekonen T Bekele
(74) *Attorney, Agent, or Firm* — HAUPTMAN HAM, LLP

(57) ABSTRACT

The image processing device (during learning) converts RGB color space of an input image and a label image into CIELAB color space and performs learning using a color difference between an inferred image and the label image as an error. The image processing device (during inference) converts RGB color space of an input image into CIELAB color space and creates an inferred image using the CIELAB input image.

5 Claims, 7 Drawing Sheets

(56) References Cited

OTHER PUBLICATIONS

Xavier et al., "Wide-Band Color Imagery Restoration for RGB-NIR Single Sensor Images", Published: Jun. 27, 2018 (Year: 2018).*
Katherine Leon "Color measurement in L* a* b* units from RGB digital images" Science Direct, pub. Mar. 11, 2006. (Year: 2006).*
International Search Report in PCT/JP2021/042010, mailed Feb. 8, 2022. 2pp.

* cited by examiner

FIG. 3

| RGB COLOR SPACE | | | RED | ORANGE | GREEN | PALE GREEN |
|---|---|---|---|---|---|---|
| | | | [240,110,80] | [240,160,30] | [150,250,30] | [100,250,80] |
| CIELAB COLOR SPACE | | | [61.88,48.04,40.66] | [72.07,20.60,71.32] | [89.37,-58.79,82.64] | [87.80,-69.98,66.69] |
| COLOR DIFFERENCE (DISTANCE) | RGB | EUCLIDEAN | 70.71 | | 70.71 | |
| | CIELAB | EUCLIDEAN | 42.38 | | 19.54 | |
| | | CIEDE2000 | 25.59 | | 6.63 | |

FIG. 4

| | COMPONENT |
|---|---|
| RGB COLOR SPACE | RED, GREEN, BLUE (PRIMARY COLORS) |
| CIELAB COLOR SPACE | L (LIGHTNESS), a/b (COMPLEMENTARY COLOR DIMENSIONS) |

NORMAL IMAGE DATA  ANOMALY IMAGE DATA

COMPUTE DIFFERENCE

SUBTRACTION IMAGE

CREATE LABEL IMAGE

LABEL IMAGE

IMAGE PROCESSING DEVICE AND COMPUTER-READABLE STORAGE MEDIUM

RELATED APPLICATIONS

The present application is a National Phase of International Application No. PCT/JP2021/042010 filed Nov. 16, 2021, which claims priority to Japanese Application No. 2020-192325, filed Nov. 19, 2020.

TECHNICAL FIELD

The present invention relates to an image processing device that uses a neural network, and a computer-readable storage medium.

BACKGROUND ART

In manufacturing sites such as factories, visual inspection is performed on products being manufactured in production lines (for example, PTL 1). For visual inspection of products, it is necessary to prepare a machine learning model that classifies images of the products into images of normal products and images of abnormal products based on captured images of the products.

To create such a machine learning model, a set of multiple images of normal products and a set of multiple images of abnormal products are each collected beforehand. The collected images are then used to perform machine learning. It is often the case with images of abnormal products that it is also desired to specify the position of abnormality in the product.

There are techniques that use neural networks for image classification and recognition. PTL 2 discloses an information processing system including: a candidate extraction unit extracting a plurality of area candidates from an input image; an image segmentation unit that segments the plurality of extracted area candidates; an image classification unit that classifies the images of the plurality of extracted area candidates, and an area determination unit that determines a recognition target area by removing some of the plurality of area candidates based on the results of segmentation and image classification.

CITATION LIST

Patent Literature

[PTL 1] Japanese Patent Application Laid-Open No. 2014-190821
[PTL 2] Japanese Patent Application Laid-Open No. 2019-061505

SUMMARY OF INVENTION

Technical Problem

A neural network is a mathematical model that represents neurons and their connections in a human brain. A neural network is constructed from an input layer, an output layer, and hidden layers, with weights between these layers that indicate the intensity of the connections between neurons.

FIG. 9 is a conceptual diagram of a conventional image processing device that uses a supervised neural network. The image processing device of FIG. 9 creates an inferred image from an input image by the neural network. The image processing device then compares the inferred image with a label image, and adjusts the weights in each layer of the neural network little by little such as to eliminate errors between the label image and the inference result.

Repeated updating of weights to minimize errors between the output and the correct label is called "learning". Through "learning", a learned neural network (model) with optimally adjusted weights is created. Data learning can be evaluated as being efficient if good inference performance is obtained relative to the number of learning data to be used and the learning results.

In the field of image processing that uses neural networks, techniques for improving the learning efficiency are sought after.

Solution to Problem

An image processing device according to one aspect of the present disclosure includes a color space conversion unit that converts an image represented by RGB color space into an image with a color space that has a lightness component, and a learning unit that optimizes a neural network using a color difference between images obtained by conversion of color spaces by the color space conversion unit as an error.

An image processing device according to one aspect of the present disclosure includes a color space conversion unit that converts a color space of an input image into an image with a color space that has a lightness component, and an inference unit that performs inference with a neural network using a color difference between input images after conversion of the color space as an error.

A storage medium according to one aspect of the present disclosure stores computer-readable commands for converting an image represented by RGB color space into an image with a color space that has a lightness component, and for optimizing a neural network using a color difference between images obtained by conversion of color spaces as an error, by being executed by one or a plurality of processors.

Advantageous Effects of Invention

According to one aspect of the present invention, learning efficiency in image processing that uses a neural network can be improved.

BRIEF DESCRIPTION OF DRAWINGS

FIG. 3 is a diagram for explaining differences in color difference between RGB and CIELAB.
FIG. 4 is a diagram for explaining differences in components between RGB and CIELAB.

DESCRIPTION OF EMBODIMENTS

[First Disclosure]

Hereinafter the present disclosure will be described in summary with reference to the drawings.

Figure 1:
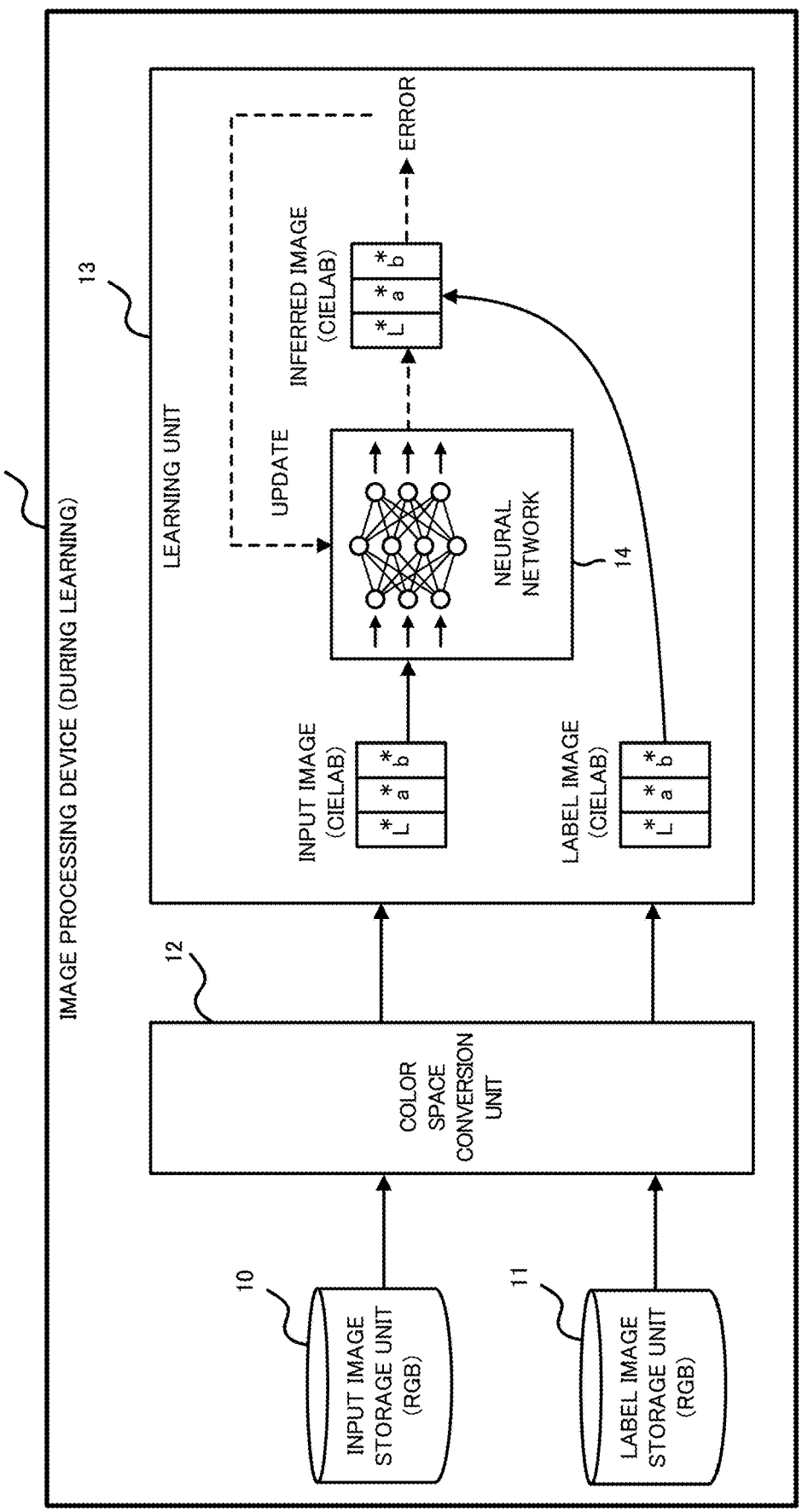
FIG. 1 is a block diagram of an image processing device (during learning) according to a first disclosure.
Figure 2:
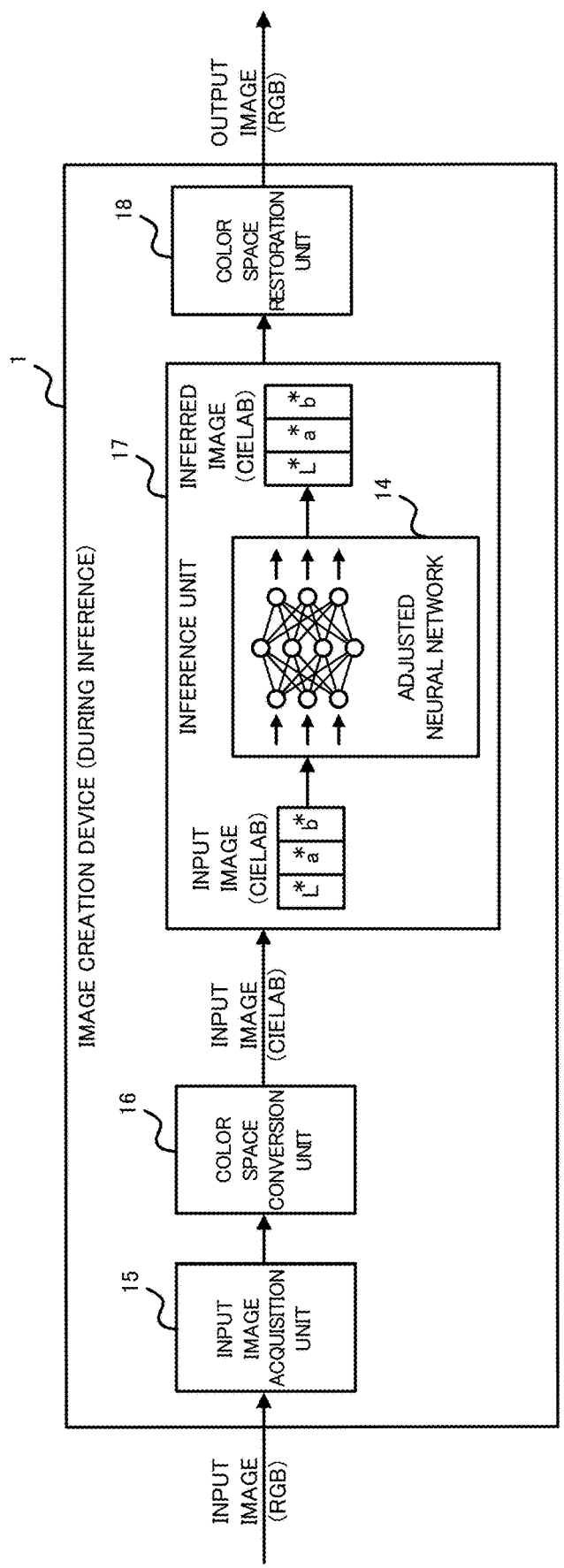
FIG. 2 is a block diagram of the image processing device (during inference) according to the first disclosure.

FIG. 1 and FIG. 2 are block diagrams of one example of an image processing device 1. FIG. 1 is a block diagram of the image processing device 1 (during learning), and FIG. 2 is a block diagram of the image processing device 1 (during inference). Learning and inference may be executed in one image processing device 1, or may each be executed in different image processing devices.

FIG. 1 illustrates the configuration and operation of the image processing device 1 (during learning). The image processing device 1 (during learning) includes an input image storage unit 10 that stores input image data, a label image storage unit 11 that stores label images, a color space conversion unit 12 that converts the color spaces of input images and label images, and a learning unit 13 that learns to create an inferred image based on input images and label images that have been converted by the color space conversion unit 12.

The input image storage unit 10 stores images to be learned. The images to be learned may be captured with a sensor (to be described later) that is part of the image processing device 1, or images captured by an external sensor may be input. Alternatively, images stored in a fog computer (to be described later) or a cloud server (to be described later) may be acquired.

The label image storage unit 11 stores label images. Label images are data sets to be paired with input images. A label image is the basis for adjusting an inferred image. Input images and label images are image data represented by RGB color space. RGB color space is a type of color representation whereby a color is represented by mixing three primary colors red (R), green (G), and blue (B).

The color space conversion unit 12 converts the RGB image data into a color space that has a lightness component. In the present disclosure, the image data is converted to CIELAB, an example of a color space that has a lightness component. CIELAB is a color space having three components L, a, and b. "L" represents lightness, and "a" and "b" represent color components complementary to each other. Positive values of "a" indicate higher intensities of red, and negative values indicate higher intensities of green. Positive values of "b" indicate higher intensities of yellow, and negative values indicate higher intensities of blue.

The color space conversion unit 12 may convert image data into any color space that has a lightness component. For example, apart from CIELAB, there are color spaces that have a lightness component, such as L*A*B* color space, L*C*h color space, and Hunter Lab color space.

The learning unit 13 includes a neural network 14. The neural network 14 creates inferred images from the input images converted to CIELAB by the color space conversion unit 12. The color space of the created inferred image is CIELAB.

The learning unit 13 inputs a label image converted to CIELAB by the color space conversion unit 12 and compares the converted label image with the inferred image created by the neural network 14. An error between the two images is obtained as a result of comparison between the label image and the inferred image. This error is a color difference. A color difference is an index defined as a distance in the color space to represent the difference between two colors. The metrics that define a color difference in the CIELAB color space include the Euclidean distance, CIE76, CIE94, and CIEDE2000.

The learning unit 13 adjusts the weights of the neural network 14 to minimize the error (color difference). The learning unit 13 repeats inputting and learning input images and label images to optimize the weights between the nodes of the neural network 14 to create a learned neural network.

FIG. 2 illustrates the configuration and operation of the image processing device 1 (during inference). The image processing device 1 (during inference) includes an input image acquisition unit 15 that acquires input images, a color space conversion unit 16 that converts the color space of input images, an inference unit 17 that creates inferred images from the input images, and a color space restoration unit 18 that restores the inferred images to RGB color space.

The input image acquisition unit 15 acquires input images. The input images are image data represented by RGB color space. The color space conversion unit 16 converts the RGB image data into CIELAB color space. The color space conversion unit 16 of FIG. 2 carries out the same processing as that of the color space conversion unit 12 of FIG. 1.

The inference unit 17 includes an adjusted neural network 14. The adjusted neural network 14 is the neural network 14 created by the learning unit 13 of FIG. 1. The adjusted neural network 14 generates inferred images from the input images.

The color space of the inferred images output by the adjusted neural network 14 is CIELAB. The color space restoration unit 18 restores the CIELAB inferred images to RGB color specification system and outputs RGB images.

As described above, the image processing device 1 of the present disclosure uses input images and label images that are converted to CIELAB for the learning and inference by the neural network 14. Lab color spaces such as CIELAB are designed to approximate human vision. The L component is extremely close to the human perceptual lightness. Therefore the device can learn images close to images as perceived by human vision.

The differences in color difference between RGB and CIELAB will be explained.

FIG. 3 represents four colors: red, orange, green, and pale green by means of RGB and CIELAB values corresponding to each color. The RGB value of red is [240, 110, 80], and the RGB value of orange is [240, 160, 30]. The CIELAB value of red is [61.88, 48.04, 40.66], and the CIELAB value of orange is [72.07, 20.60, 71.32].

The color difference (Euclidean distance) in RGB values between red and orange is 70.71. The color difference (Euclidean distance) in CIELAB values between red and orange is 42.38, and the color difference (CIEDE2000) is 25.59.

The RGB value of green is [150, 250, 30], and the RGB value of pale green is [100, 250, 80]. The RGB value of pale green is [100, 250, 80]. The CIELAB value of green is [89.37, −58.79, 82.64], and the CIELAB value of pale green is [87.80, −69.98, 66.69].

The color difference (Euclidean distance) in RGB values between green and pale green is 70.71, which is the same as the color difference between red and orange. The color difference (Euclidean distance) in CIELAB values between green and pale green is 19.54, and the color difference (CIEDE2000) is 6.63.

While human vision can clearly distinguish the difference between red and orange on the left side of FIG. 3, green and pale green on the right side are perceived as similar colors. The color differences (Euclidean distances) in RGB between red and orange and between green and pale green are equal, both being 70.71, i.e., RGB values do not represent the color difference perceived by human.

The color difference (Euclidean distance) in CIELAB between red and orange is 42.38, and the color difference (Euclidean distance) in CIELAB between green and pale green is 19.54. The color difference (Euclidean distance) between red and orange is larger than the color difference (Euclidean distance) between green and pale green, i.e., the values represent the color difference perceived by human.

The color difference (CIEDE2000) in CIELAB values between red and orange is 25.59, and the color difference (CIEDE2000) between green and pale green is 6.63. The color difference (CIEDE2000) between red and orange is larger than the color difference (CIEDE2000) between green and pale green, i.e., the values represent the color difference perceived by human.

As shown in FIG. 4, RGB consists of the primary colors R (red), G (green), and B (blue). CIELAB consists of L (lightness) and a/b (complementary color dimensions). RGB has no lightness component. Human vision is more sensitive to lightness. Since human vision perceives a difference in lightness more clearly than a difference in chroma, a color space having a lightness component provides representations closer to human vision. Namely, a neural network (model) close to human vision can be created through learning with the use of a color space having a lightness component.

[Second Disclosure]

Figure 5:
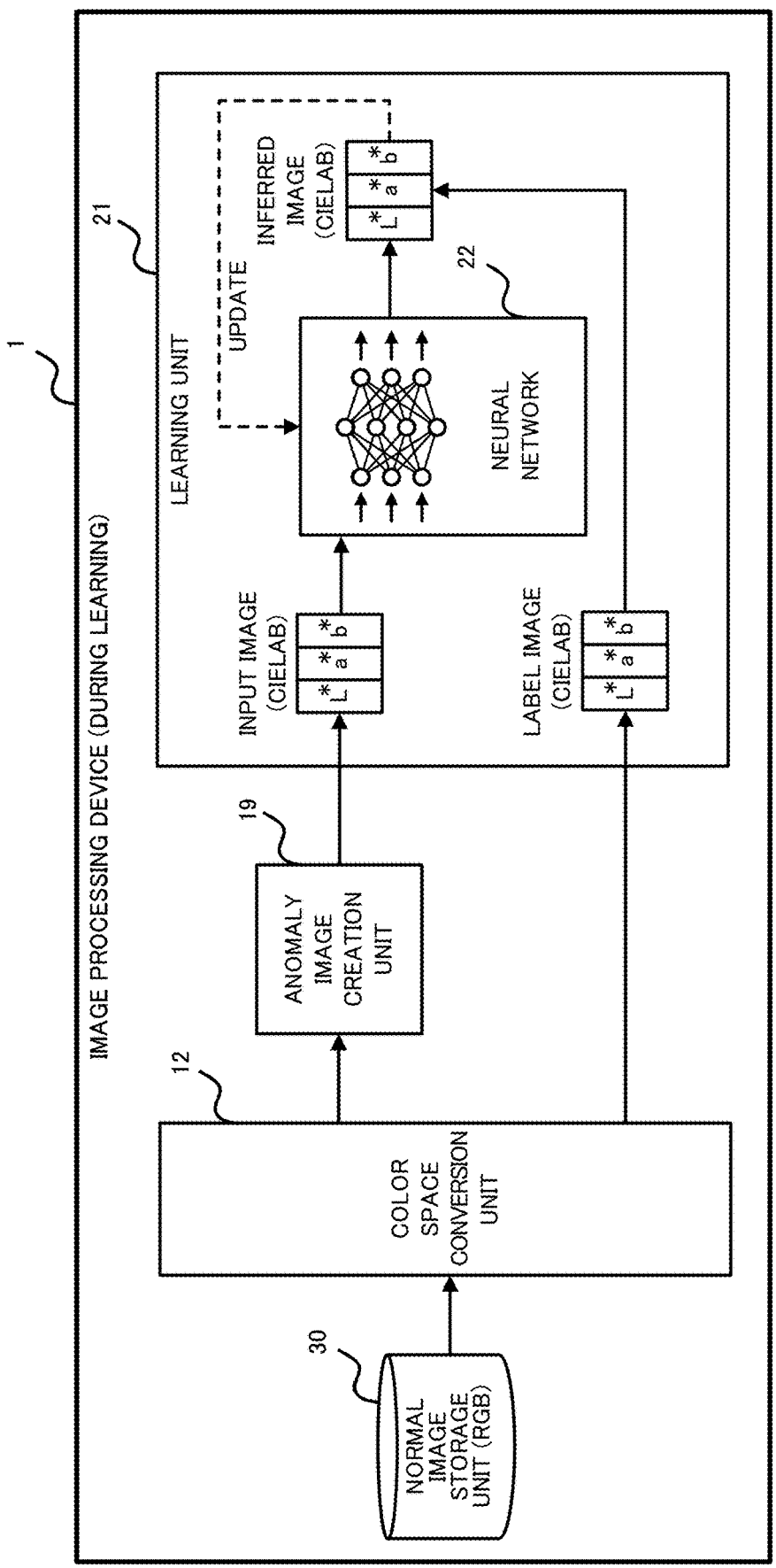
FIG. 5 is a block diagram of an image processing device (during learning) according to a second disclosure.
Figure 7:
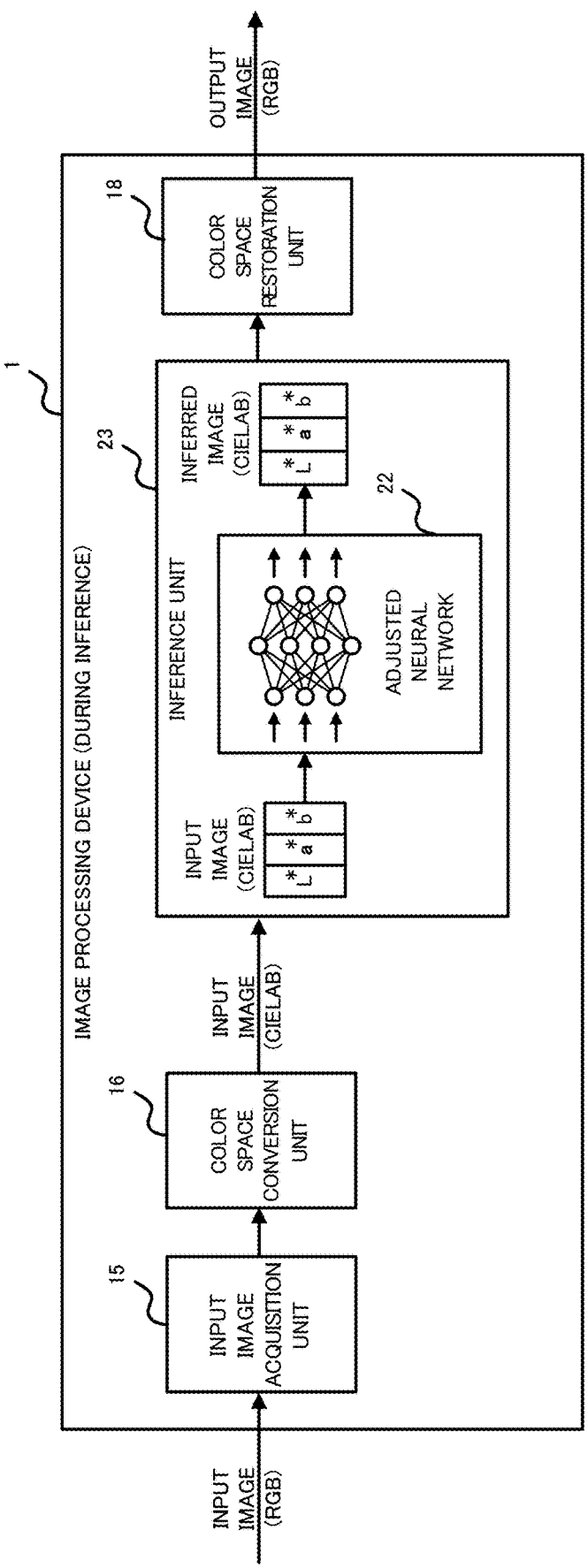
FIG. 7 is a block diagram of the image processing device (during inference) according to the second disclosure.

In the second disclosure, an image processing device 1 that performs supervised learning with artificial anomaly images will be described. FIG. 5 is a block diagram of the image processing device 1 (during learning) of the second disclosure, and FIG. 7 is a block diagram of the image processing device 1 (during inference) of the second disclosure.

The image processing device 1 (during learning) of FIG. 5 includes a normal image storage unit 30 that stores captured normal RGB images of products, a color space conversion unit 12 that converts the color space of input images, and a learning unit 21 that creates a neural network model from the normal images.

The normal image storage unit 30 stores image data of products captured by a sensor (to be described later) attached to an industrial machine (not shown), for example. The image data stored in the normal image storage unit 30 includes image data of normal products (hereinafter referred to as normal images).

The color space conversion unit 12 converts the RGB color specification system of normal images stored in the normal image storage unit 30 into CIELAB color space.

An anomaly image creation unit 19 creates anomaly images based on the normal images stored in the normal image storage unit 30. The anomaly images created by the anomaly image creation unit 19 are used as input images for the neural network to learn. It is sometimes the case in production inspection that there is not a sufficient number of anomaly image samples and anomaly images are generated artificially to compensate for the insufficient number of samples.

The anomaly image creation unit 19 may create an anomaly image by overlapping a predetermined figure on part of the image of the product in the normal image. Alternatively, the anomaly image creation unit 19 may create an anomaly image by processing the normal image such as changing the hue, chroma, and lightness of part of the image, or mosaicing part of the image. Furthermore, the anomaly image creation unit 19 may create an anomaly image by adding or removing a predetermined figure to or from part of the image of the product in the normal image (by deforming the image). The anomaly images should desirably be images that encompass various combinations of types, positions, sizes, colors of defects expected to occur in actual scenes, background materials, lighting settings, and so on.

Figure 6:
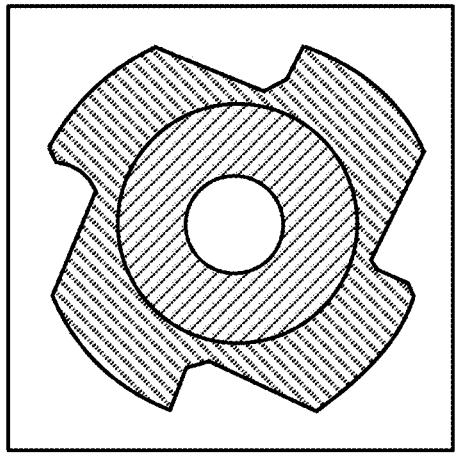
FIG. 6 is a diagram for explaining a method of creating an anomaly image and a label image.
Figure 6:
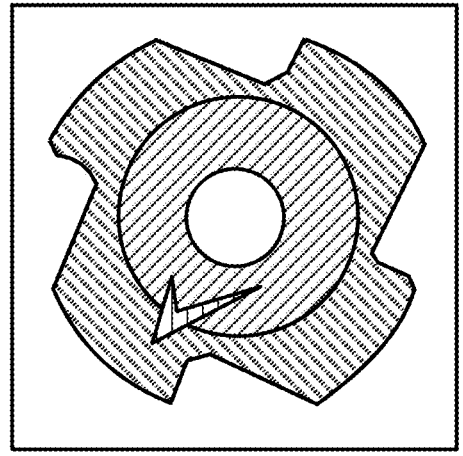
Figure 6:
Figure 6:
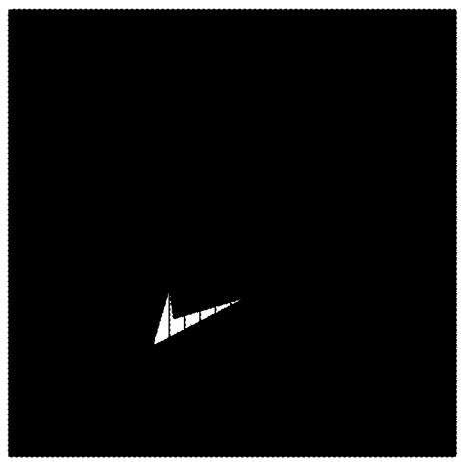
Figure 6:
Figure 6:
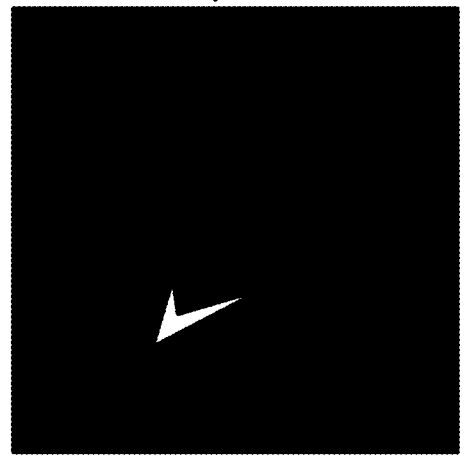

FIG. 6 shows an example of creating an anomaly image by overlapping a predetermined figure (geometric shape) on part of the image of the product in the normal image. The predetermined image data to be overlapped may be stored in advance, or a geometric shape may be created as the predetermined figure at the time of creating the anomaly image. The predetermined figure should desirably have a color similar to the color of the product but different from the color of the product. The predetermined figure may be overlapped on any given position of the image of the product, which may be determined by computing a random value, for example. The predetermined figure thus added represents a portion of the product where the processing quality is lower, or a missing portion of the product. The predetermined image to be overlapped on the normal image is stored in CIELAB or converted to CIELAB beforehand.

The color space of the normal images is CIELAB, and so is the image data to be overlapped, so that the input image (anomaly image) created by the anomaly image creation unit 19 is also CIELAB.

The learning unit 21 performs learning based on the normal images converted to CIELAB by the color space conversion unit 12 (label image) and the input images created in CIELAB by the anomaly image creation unit 19 (anomaly image). Pix2Pix that learns per-pixel mapping to translate one image into another is one applicable learning method.

In the second disclosure, the learning unit 21 creates training data using the anomaly images as input images and the normal images as the label images, and performs learning based on the created training data.

The neural network 22 that configures the learning unit 21 may use the data for a task that inputs an anomaly image and outputs a normal image (repair task), or for creating an image highlighting the position or size of an abnormal portion in the anomaly image.

FIG. 7 illustrates the configuration and operation of the image processing device 1 (during inference) in the second disclosure. The image processing device 1 (during inference) includes an input image acquisition unit 15 that acquires input image data, a color space conversion unit 16 that converts the color space of input image data, an inference unit 23 that creates inferred image data from the input image data, and a color space restoration unit that restores the inferred image data to RGB color space.

The input image acquisition unit 15 acquires input images. The input images are acquired from a sensor attached to an industrial machine, for example. The color space of the input images is RGB.

The color space conversion unit 16 converts the input images represented by RGB color space into CIELAB.

The inference unit 23 includes an adjusted neural network 22 created by the learning unit 21. The inference unit 23 inputs the input image data that has been converted to CIELAB, and creates a label image that indicates an abnormal portion of the input image data.

The contents the inference unit 23 infers differ depending on the configuration of the learning unit 21. The inference unit 23 may create a normal image generated by removing an abnormal portion from the input image, or an image highlighting the position or size of an abnormal portion, instead of the label image. The color space of the image data output from the inference unit 23 is CIELAB irrespective of the learned contents.

The color space restoration unit 18 restores the CIELAB image data created by the inference unit 23 into RGB color space. Thus the image output by the image processing device 1 (during restoration) is RGB.

As described above, the image processing device 1 of FIG. 5 creates anomaly images from normal image data and uses the anomaly images as samples in supervised learning. Generally, anomaly images usable for learning are hardly available in manufacturing sites such as factories. Accordingly, the image processing device in the second disclosure creates artificial anomaly images to secure a necessary number of samples for the learning.

The image processing device 1 in the second disclosure generates anomaly images using normal images that are converted to CIELAB. The learning is performed based on CIELAB color space according to the second disclosure so that a model that is closer to human vision can be created.

[Hardware Configuration of Image Processing Device]

Figure 8:
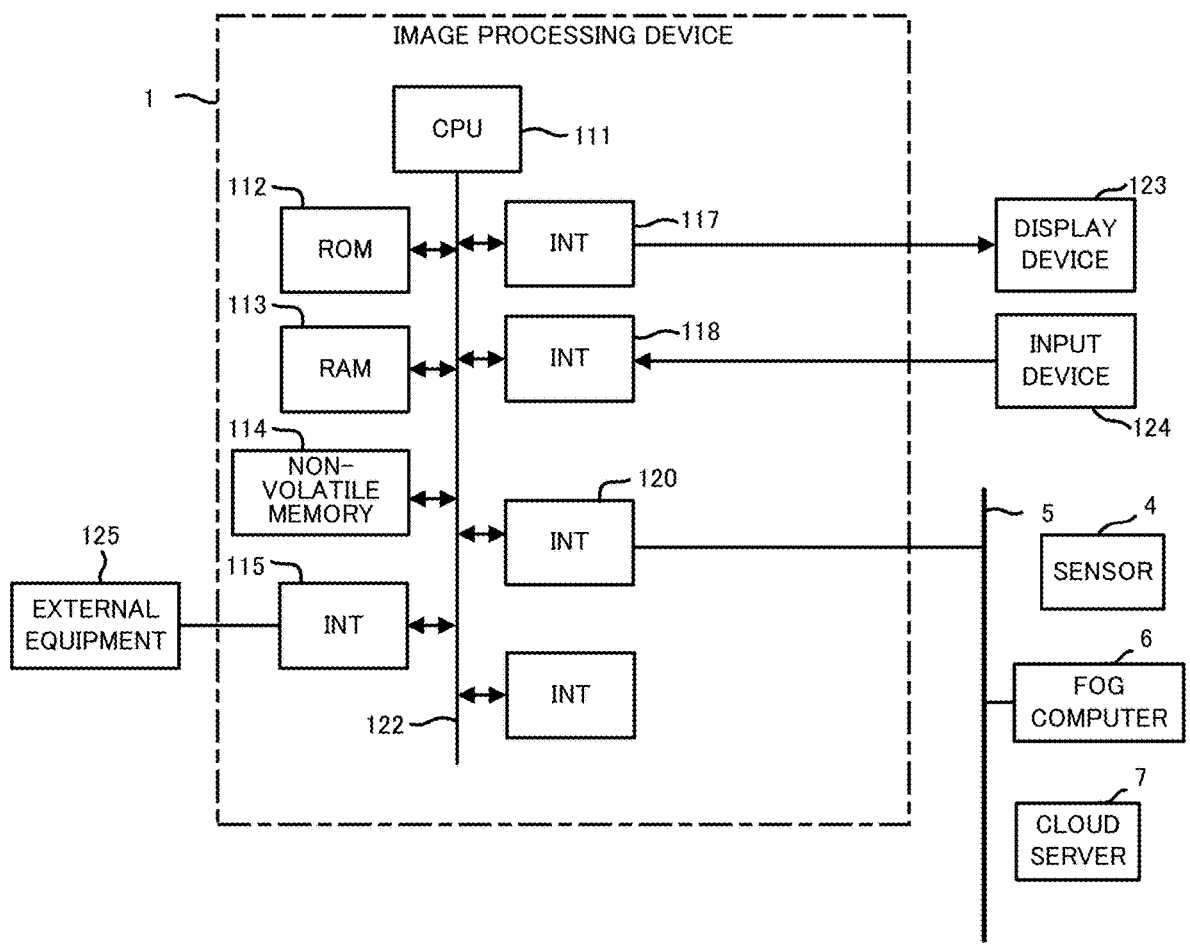
FIG. 8 is a diagram illustrating a hardware configuration of the image processing device.
Figure 9:
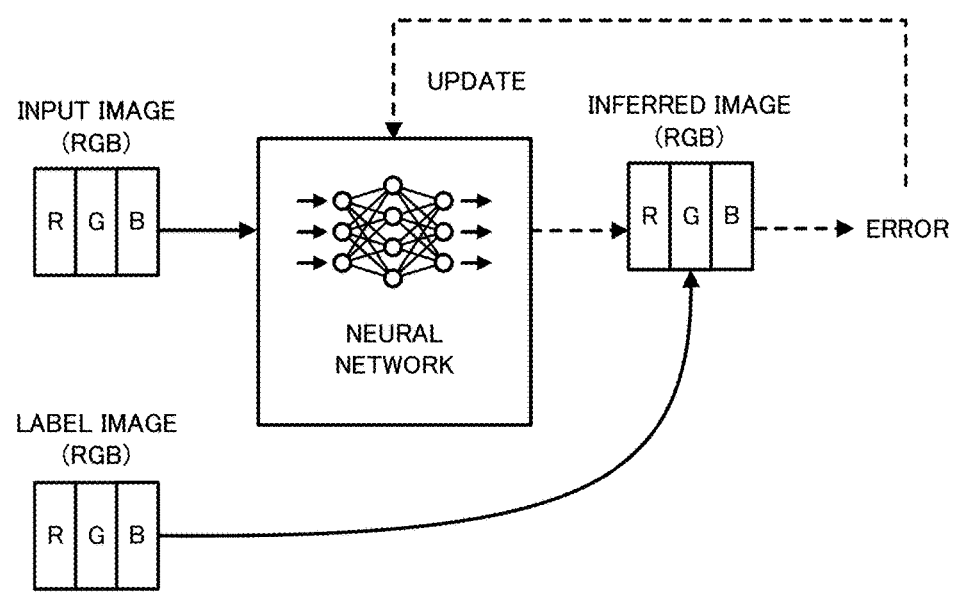
FIG. 9 is a conceptual diagram of a conventional image processing device that uses a neural network.

FIG. 8 shows a hardware configuration of the image processing device 1. The image processing device 1 includes a CPU 111, which is a processor that performs overall control of the image processing device 1. The CPU 111 reads out a system program stored in a ROM 112 via a bus 122 and controls the entire image processing device 1 in accordance with the system program. A RAM 113 temporarily stores transient calculation data, display data, and various types of data input from outside.

A non-volatile memory 114 is made up of a memory backed up by a battery (not shown), and an SSD (Solid State Drive) or the like, for example, and retains stored data even when the image processing device 1 is turned off. The non-volatile memory 114 also stores data taken in from external equipment 125 via an interface 115, data input via an input device 124, and data acquired from an industrial machine (not shown) via a network 5. The stored data may include image data of products captured by a sensor 4 such as a visual sensor attached to the industrial machine, for example. The data stored in the non-volatile memory 114 may be deployed in the RAM 113 when executed or used. Various system programs such as known analysis programs are written in the ROM 112 beforehand.

The interface 115 is an interface for connecting the CPU 111 of the image processing device 1 with external equipment 125 such as USB devices. Data regarding the products manufactured by each industrial machine, for example, (e.g., image data of normal products, CAD data indicating the shapes of products, etc.) can be read in from the external equipment 125. The data edited in the image processing device 1 can be stored in an external storage means such as a CF card via the external equipment 125.

The interface 120 is an interface for connecting the CPU 111 of the image processing device 1 with a wired or wireless network 5. To the network 5 are connected the industrial machine, a fog computer 6, a cloud server 7, etc., and these devices and the image processing device 1 exchange data with one another.

A display device 123 displays the data read into the memory, and the data acquired as the results of execution of a program, output via an interface 117. The input device 124, which is composed of a keyboard, a pointing device, and so on, transmits instructions based on operations by an operator, data and so on, to the CPU 111 via an interface 118.

While the image processing device shown in FIG. 8 has CPU 111 alone as the computing device, a GPU (Graphical Processing Unit) may also be used for the learning by the neural network.

While one embodiment of the present invention has been described above, the present invention is not limited to the examples in the embodiment described above and may be carried out in various manners by adding suitable changes.

The invention claimed is:

1. An image processing device comprising:
a color space conversion unit configured to convert an image represented by RGB color space into an image with a color space that has a lightness component; and
a learning unit configured to optimize a neural network using a color difference between images obtained by conversion of color spaces by the color space conversion unit as an error, wherein
the color space conversion unit is configured to convert an input image and a label image represented by RGB color space into images with a color space that has a lightness component, and
the learning unit is configured to optimize a neural network using a color difference between an input image and a label image obtained by conversion of color spaces by the color space conversion unit as an error.

2. The image processing device according to claim 1, wherein
the image represented by RGB color space is a normal image,
the image processing device comprising an anomaly image creation unit configured to create an anomaly image based on the normal image after conversion of color spaces by the color space conversion unit, and
the learning unit is configured to optimize a neural network using a color difference between the normal image and the anomaly image as an error, the normal image after conversion of color spaces by the color space conversion unit being used as a label image, and the anomaly image being used as an input image.

3. The image processing device according to claim 2, wherein the image represented by RGB color space is a captured normal image of a normal target object.

4. An image processing method comprising the steps of:
converting an image represented by RGB color space into an image with a color space that has a lightness component;
learning to optimize a neural network using a color difference between images obtained by conversion of the color spaces as an error;
converting an input image and a label image represented by RGB color space into images with a color space that has a lightness component; and
optimizing a neural network using a color difference between an input image and a label image obtained by conversion of color spaces by the color space conversion unit as an error.

5. A non-transitory computer-readable storage medium storing computer-readable commands, which, when executed by one or a plurality of processors,
convert an image represented by RGB color space into an image with a color space that has a lightness component,
perform learning to optimize a neural network using a color difference between images obtained by conversion of the color spaces by the color space conversion unit as an error, convert an input image and a label image represented by RGB color space into images with a color space that has a lightness component, and optimize a neural network using a color difference between an input image and a label image obtained by conversion of color spaces by the color space conversion unit as an error.

* * * * *